Jan. 3, 1967   S. B. BROUSE ETAL   3,295,436
KNOTTER MECHANISM FOR WIRE-TYING APPARATUS
Filed Feb. 10, 1965   11 Sheets-Sheet 6
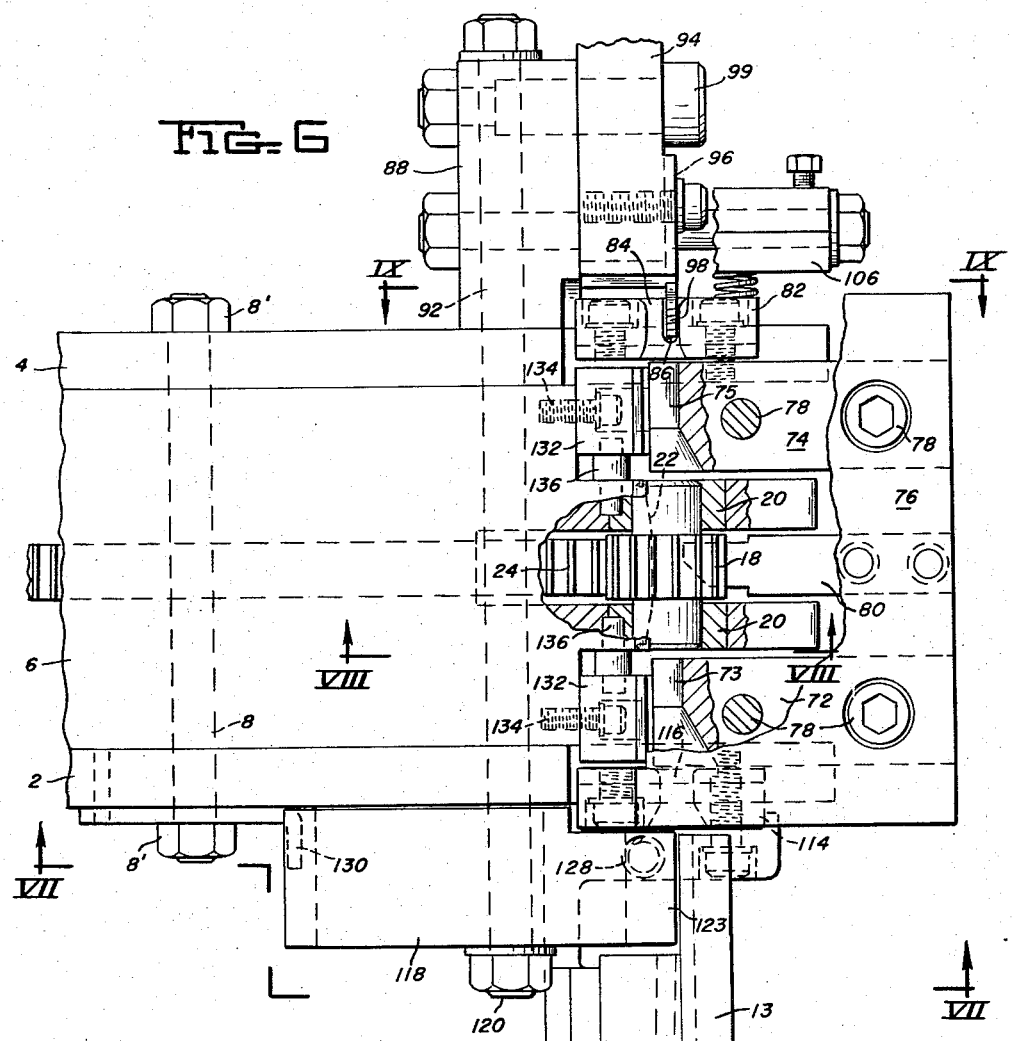
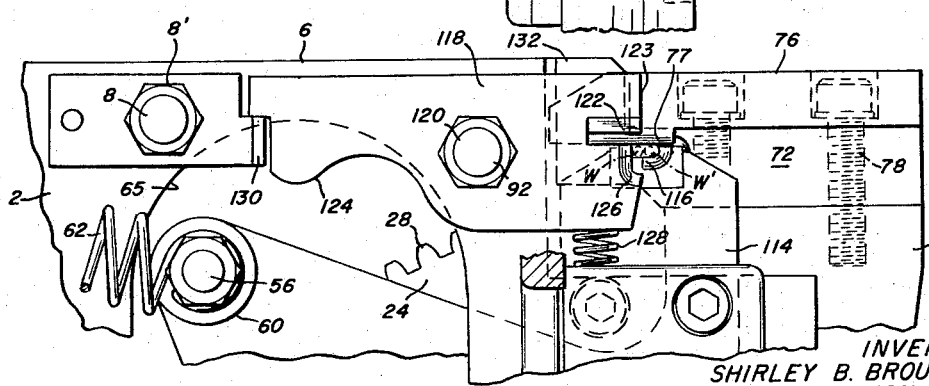
INVENTORS
SHIRLEY B. BROUSE,
JACK J. DALTON and
MARCHAND B. HALL
By Donald G. Dalton Attorney

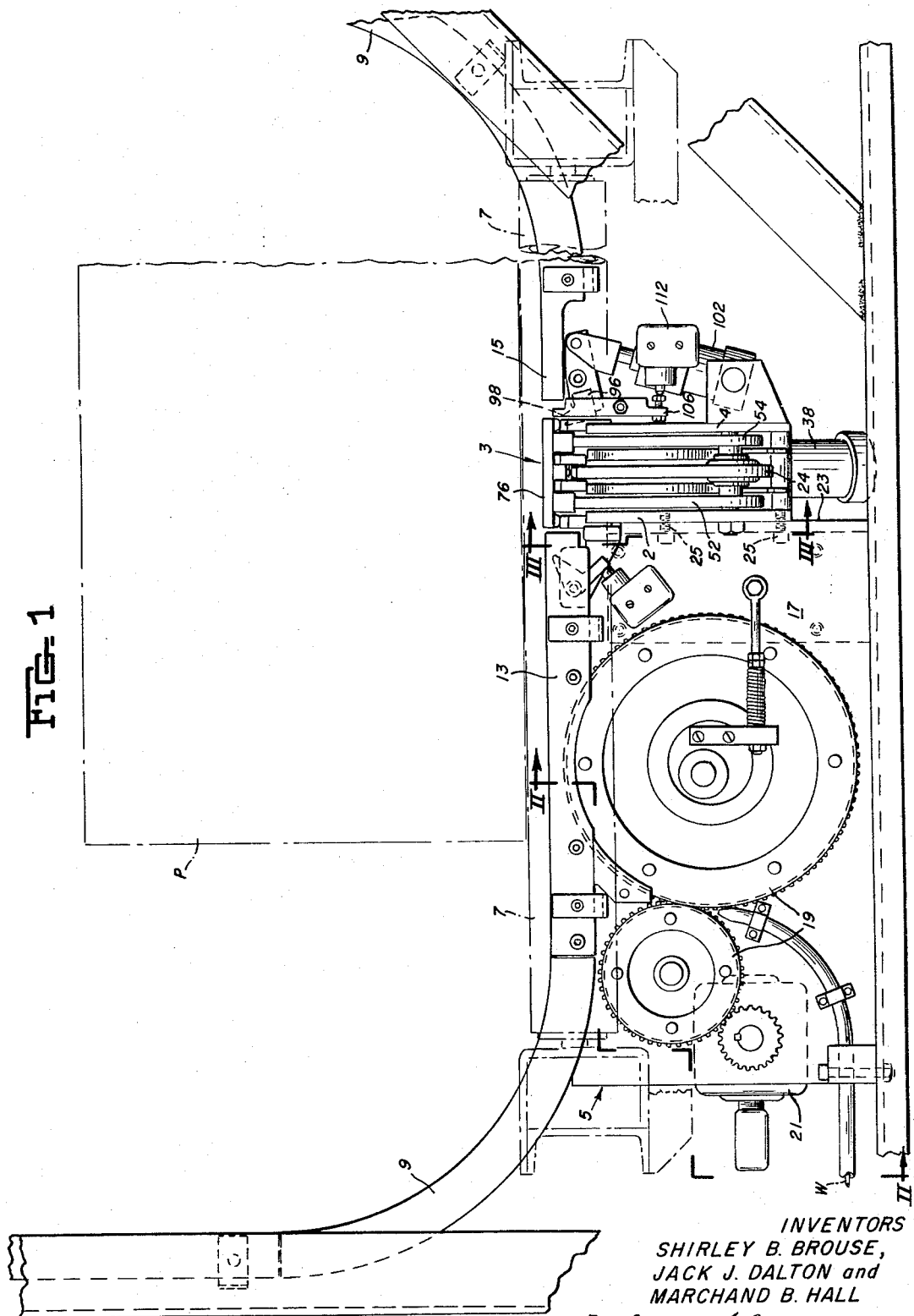

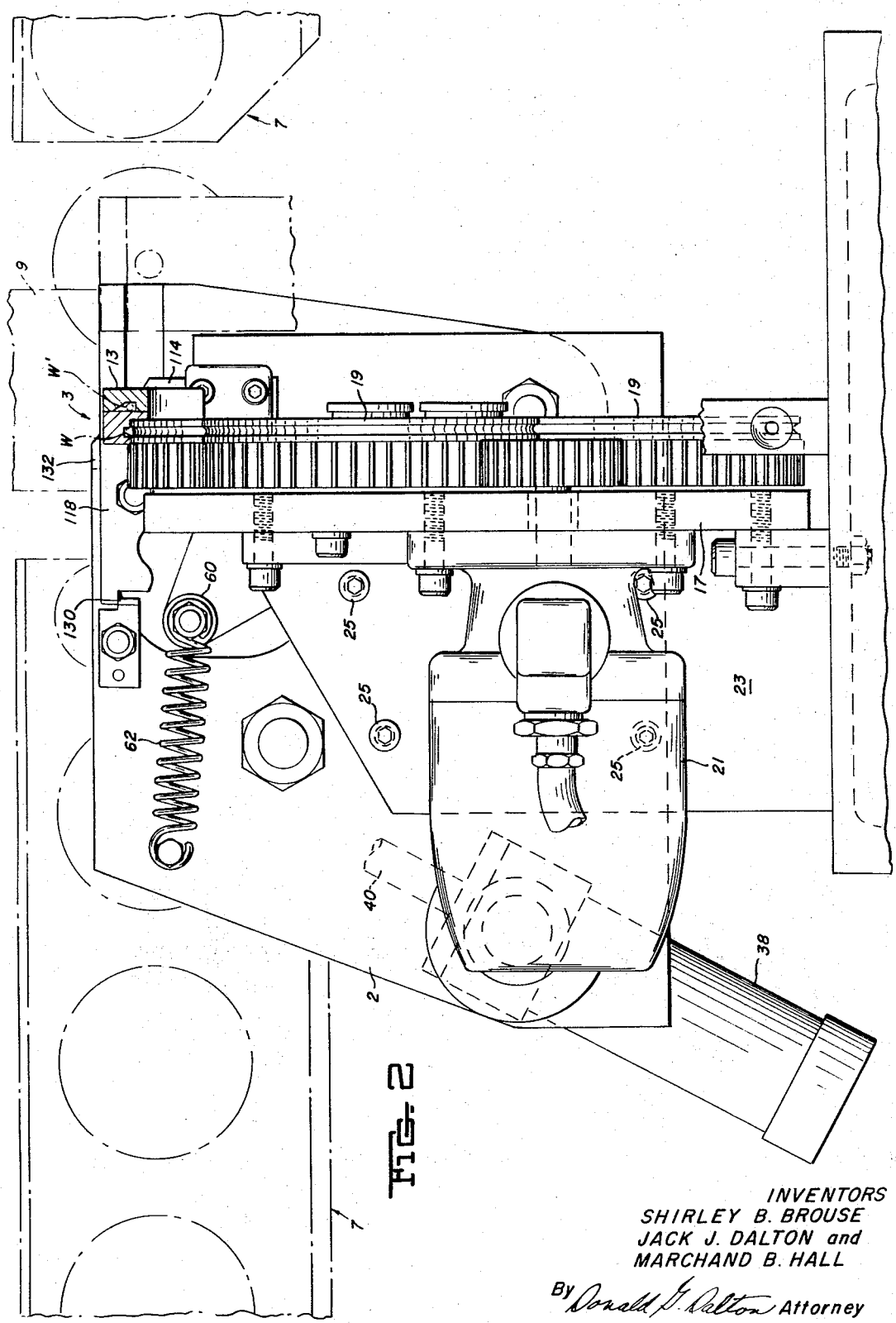

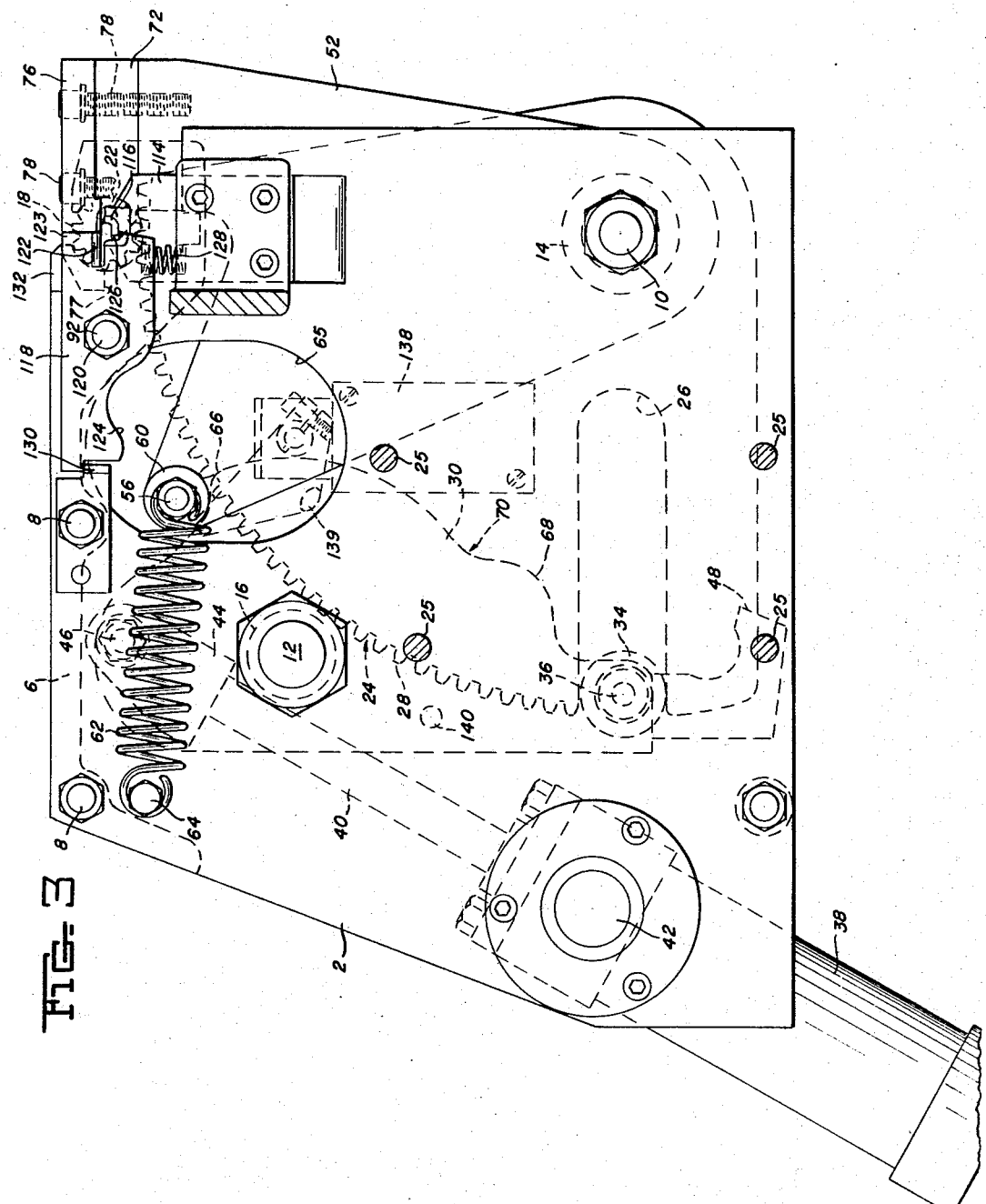

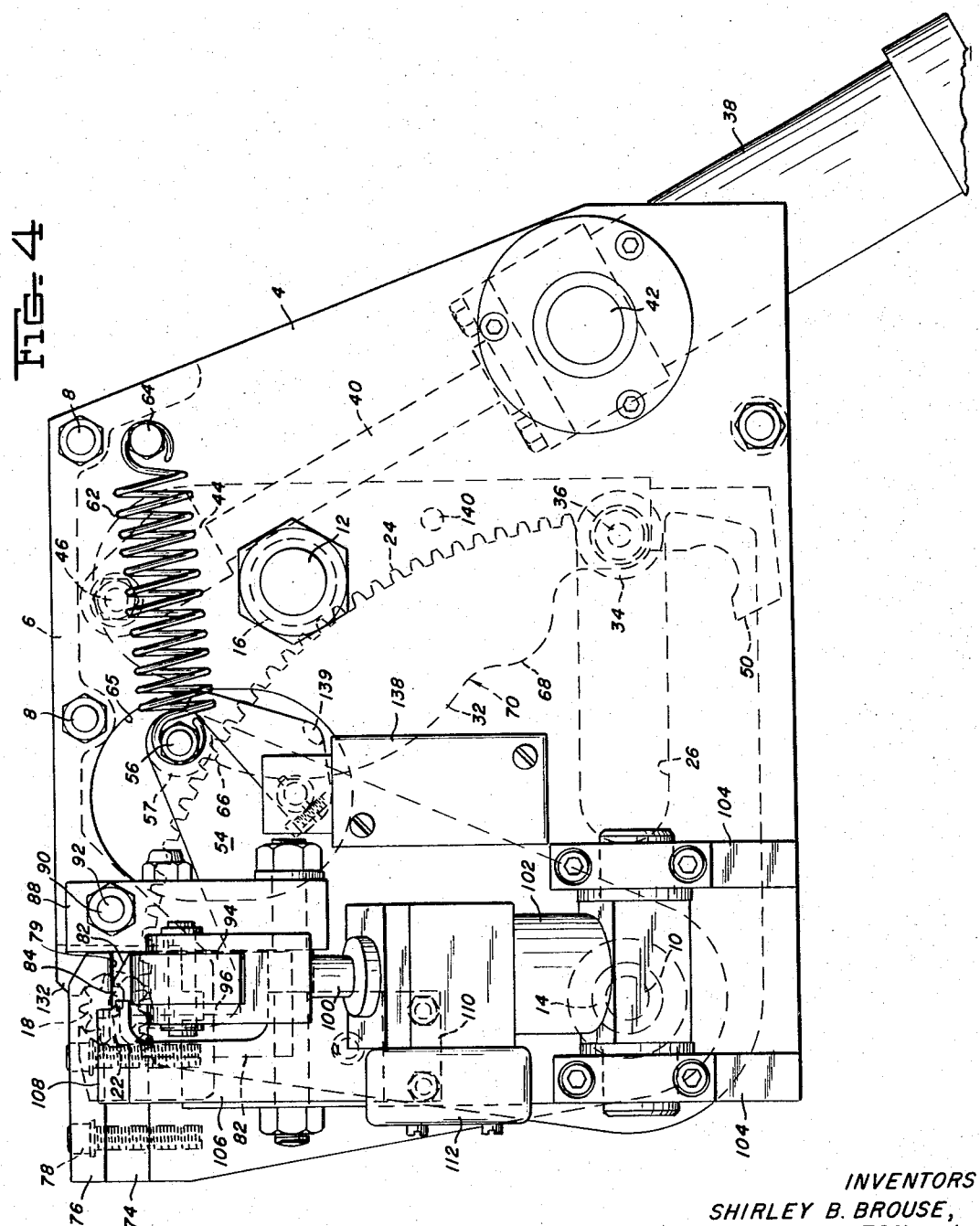

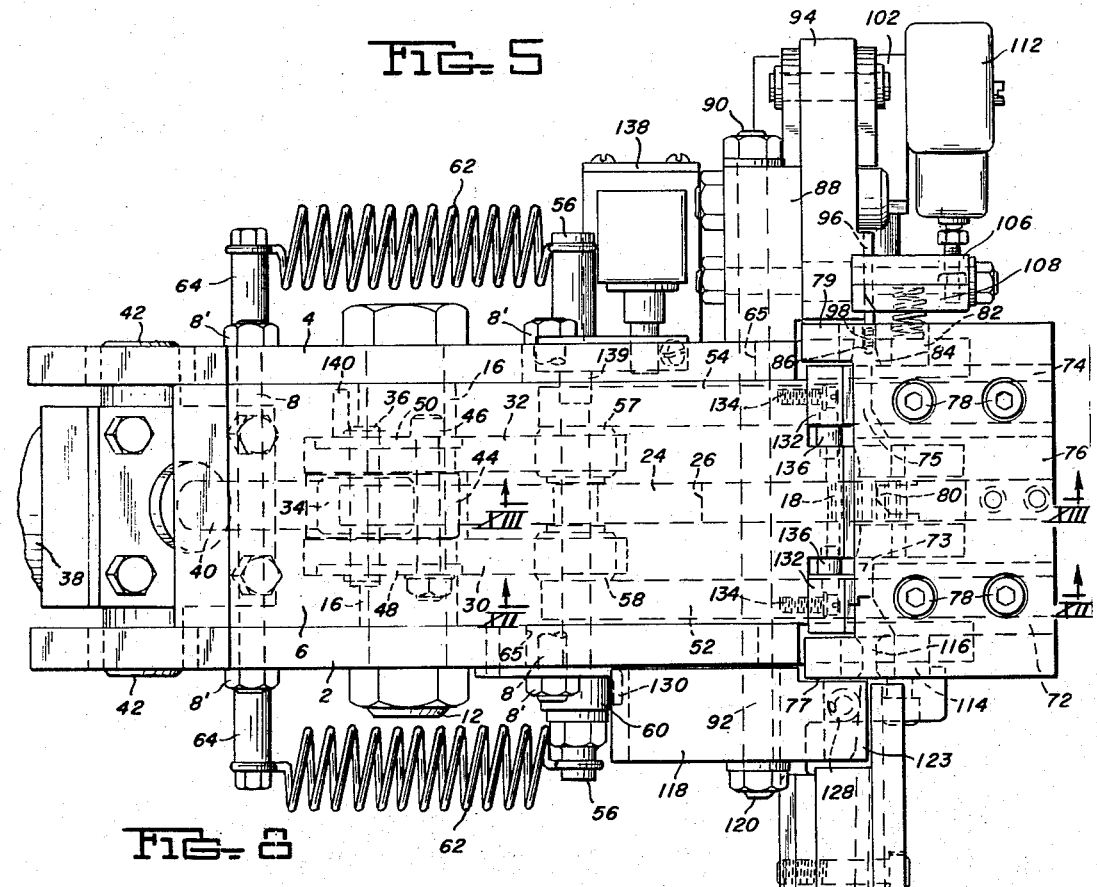

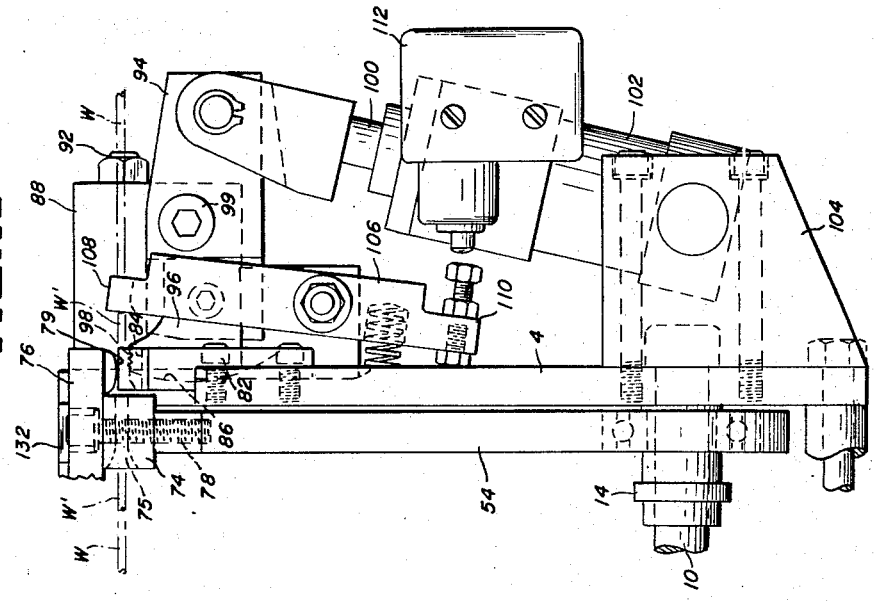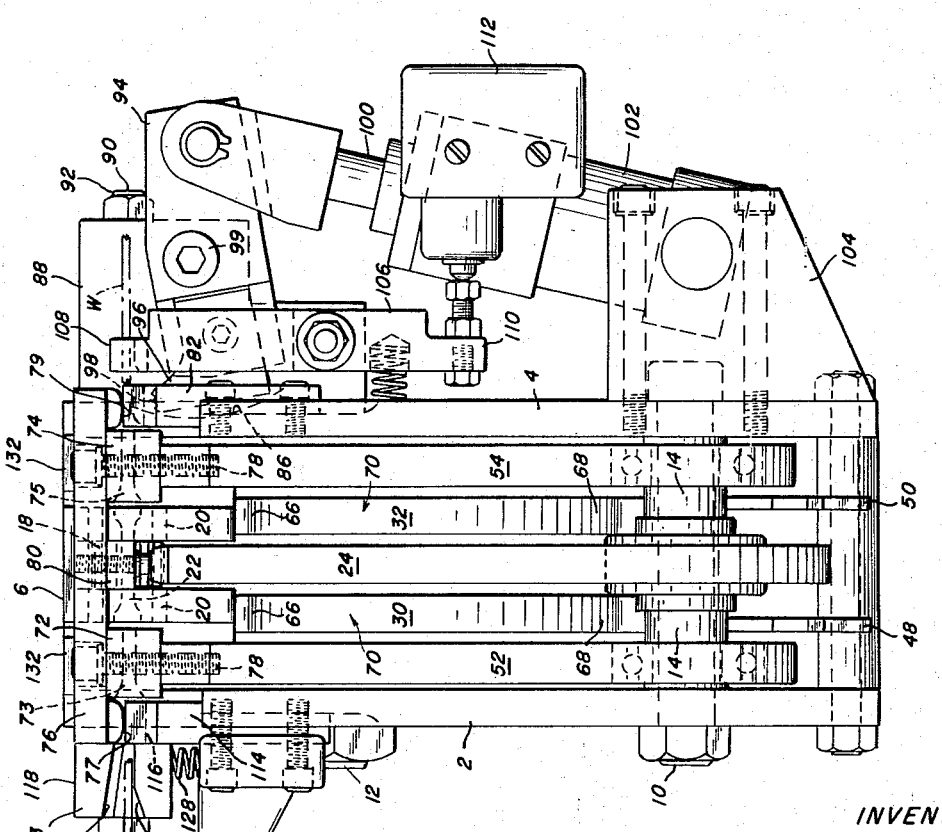

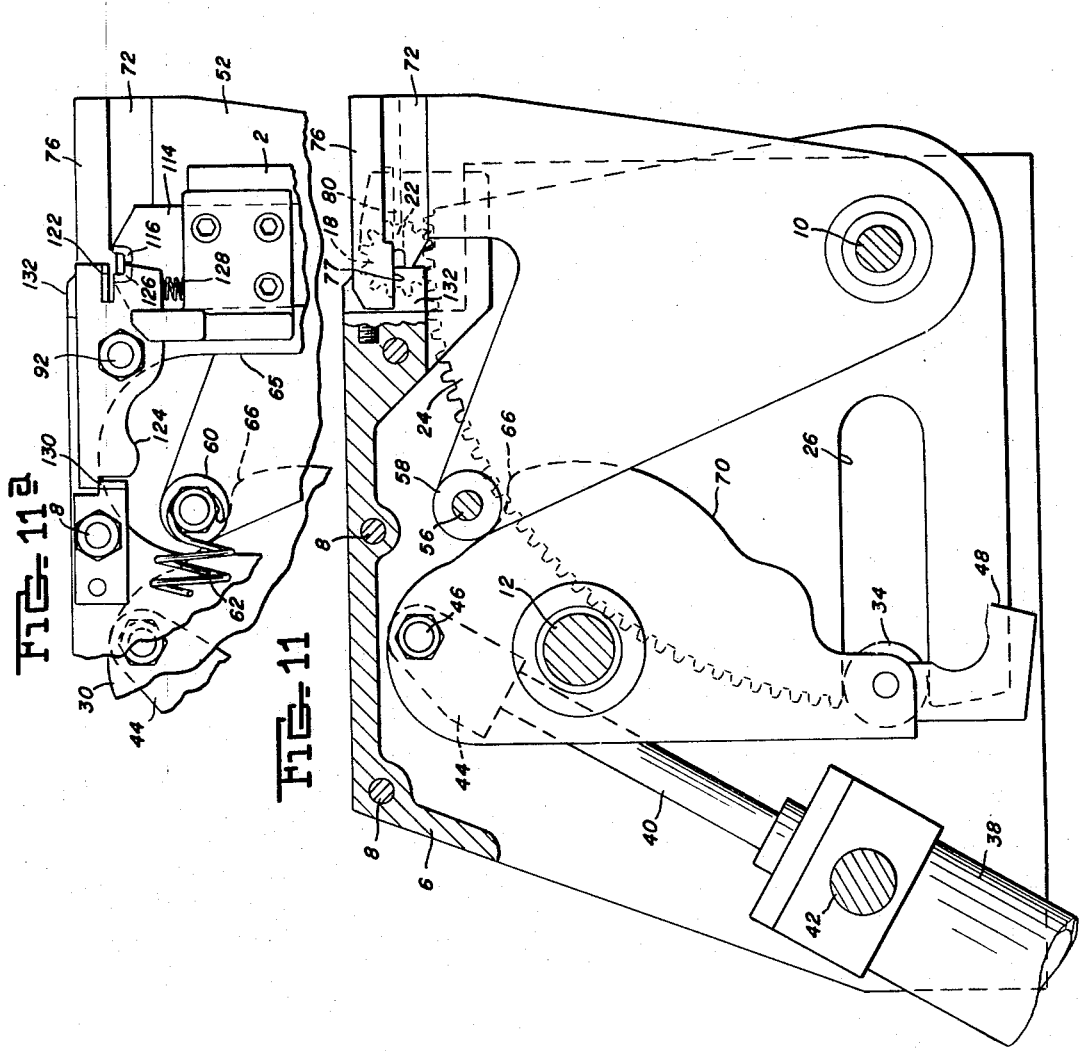

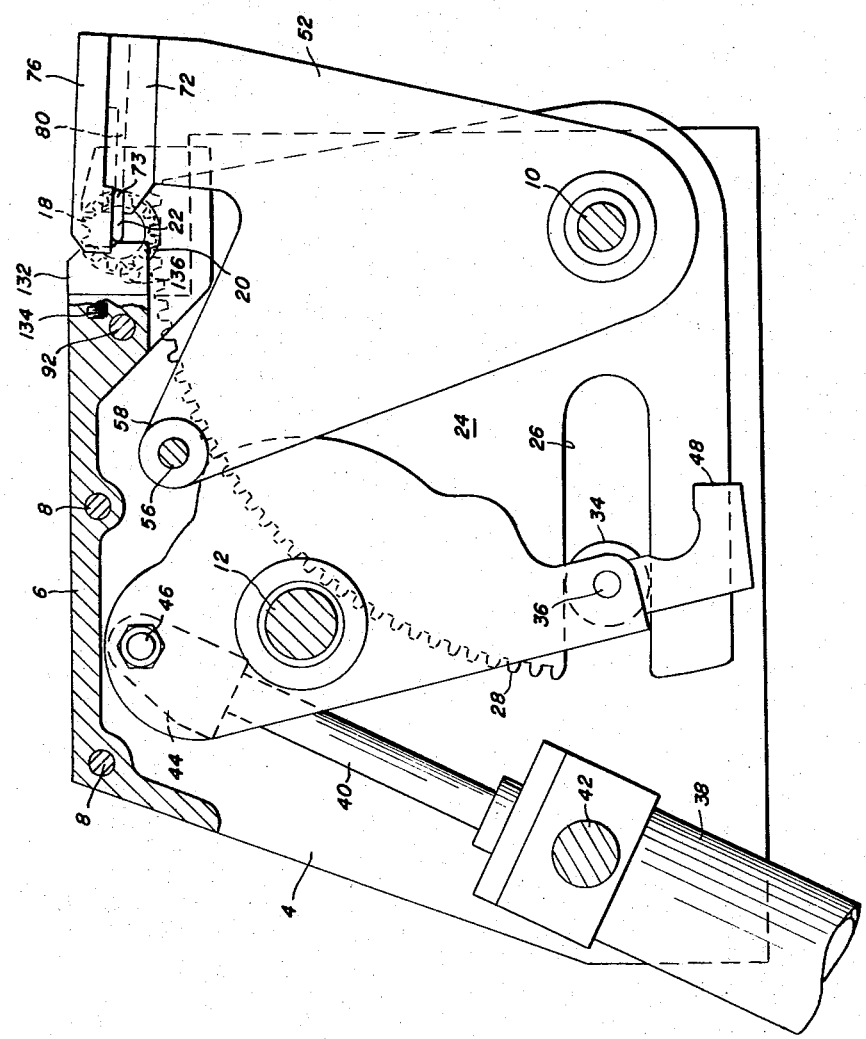

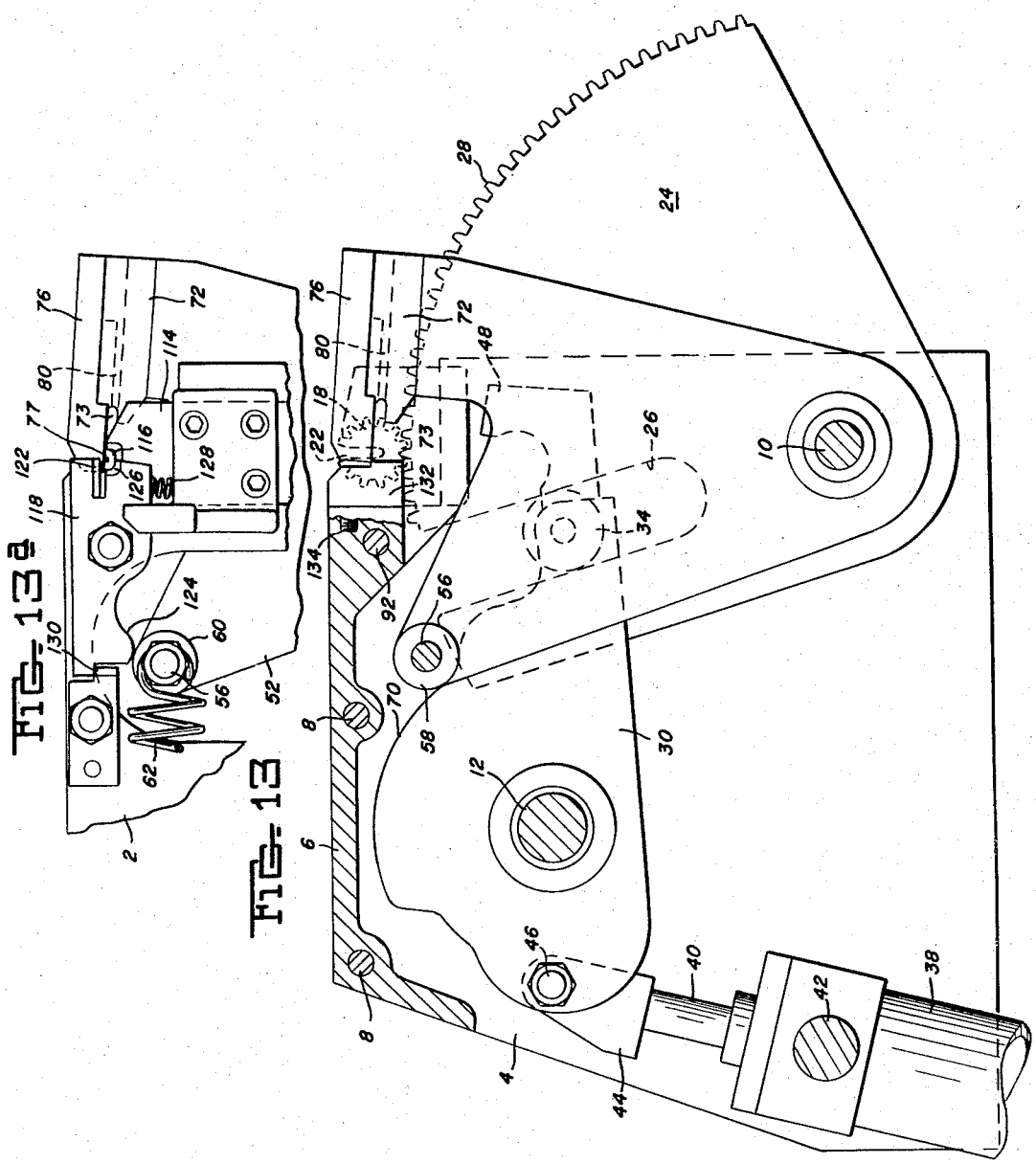

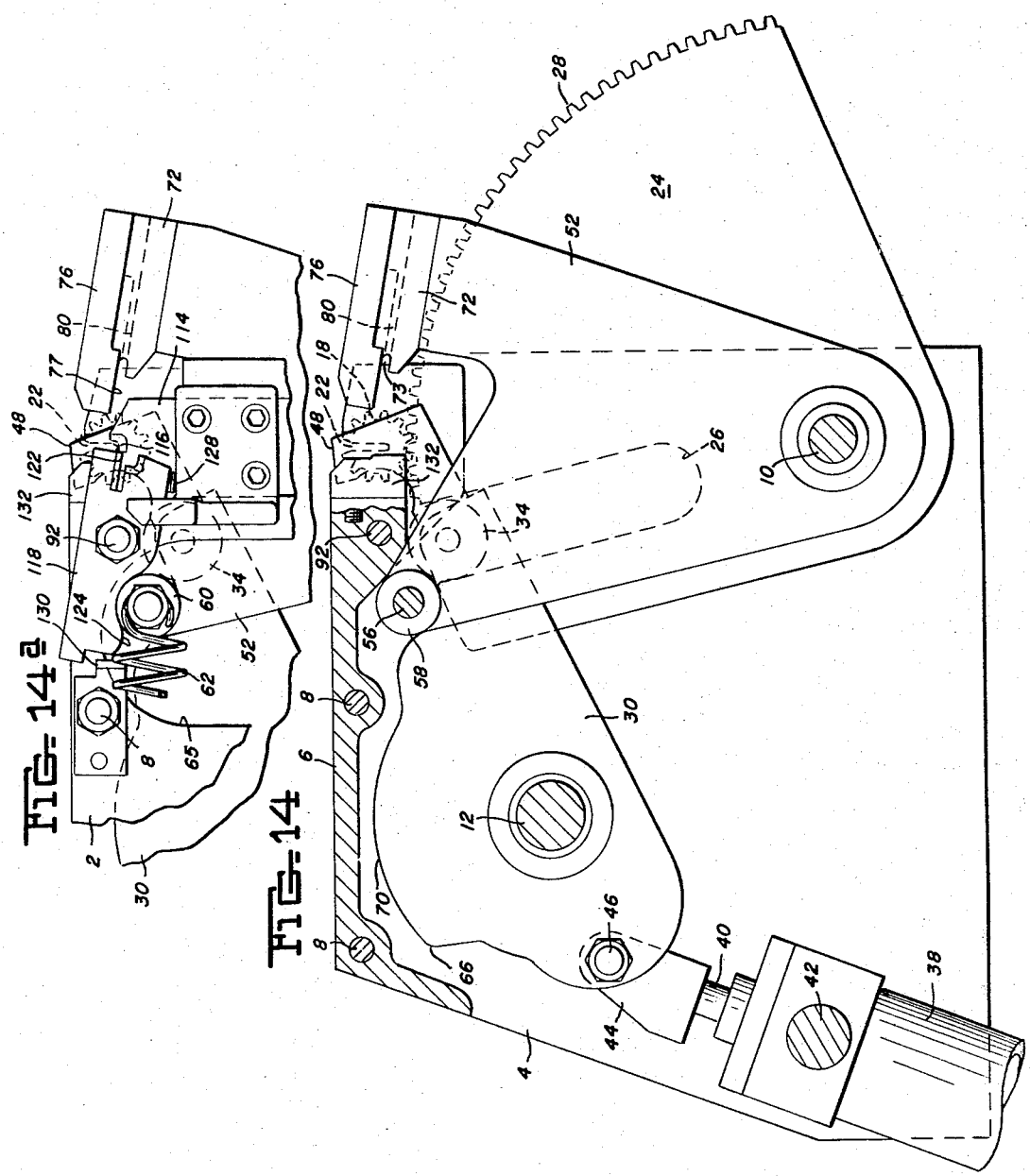

United States Patent Office 3,295,436
Patented Jan. 3, 1967

3,295,436
KNOTTER MECHANISM FOR WIRE-TYING
APPARATUS
Shirley B. Brouse, Oak Lawn, and Jack J. Dalton and Marchand B. Hall, Olympia Fields, Ill., assignors to United States Steel Corporation, a corporation of Delaware
Filed Feb. 10, 1965, Ser. No. 431,618
6 Claims. (Cl. 100—31)

The present invention relates generally to automatic machines for applying a wire tie around a package. An example of one machine of this general type is disclosed by Brouse et al. Patent No. 2,192,099.

In the operation of this type of machine, the supply wire from which a tie is to be made is fed around a guide track in the form of a loop, with the ends of the tie overlapped in the slot of a twister pinion. The package to be tied is then placed within the guide track surrounded by the loop of supply wire, and the wire is retracted to strip the wire loop from the guide track and draw it taut around the package. Then, while the wire is held under tension, the pinion is rotated to twist the overlapped ends of the wire together and form the tie. The tie is then cut free from the supply wire and ejected from the slot of the twister pinion.

The improvements claimed herein relate to the means for forming the knot in the tie, cutting the tie from the supply wire and ejecting the completed tie from the twister pinion. Other parts of the machine, such as the feed-tension mechanism and the guide track may be of any suitable construction. These latter elements are not claimed herein and are shown diagrammatically or in detail only to an extent necessary for a clear understanding of the present invention.

The novel features of the knotter mechanism of our invention, as herein described and claimed, may be used in any automatic wire-tying machine of the same general type as the above-mentioned Brouse et al. machine.

It is, accordingly, the primary object of our invention to provide a knotter mechanism for a wire-tying machine which is simple in construction, comparatively inexpensive to manufacture and maintain and more efficient in use than those which have been heretofore proposed.

This and other objects will become more apparent after referring to the following specification and attached drawings, in which:

FIGURE 1 is an elevational view of a wire-tying apparatus having the knotter mechanism of the invention incorporated therein;

FIGURE 2 is an elevational view taken along the line II—II of FIGURE 1;

FIGURE 3 is an enlarged side elevational view of the left side of the knotter mechanism taken along the line III—III of FIGURE 1;

FIGURE 4 is a view similar to FIGURE 3 but looking toward the opposite side of the knotter mechanism;

FIGURE 5 is a top plan view of the knotter mechanism and the entry portion of the guide track;

FIGURE 6 is an enlarged partial view of FIGURE 5 with parts broken away for clarity;

FIGURE 7 is an elevational view taken along the line VII—VII of FIGURE 6;

FIGURE 8 is a vertical sectional view taken along the line VIII—VIII of FIGURE 6;

FIGURE 9 is a vertical sectional view taken along the line IX—IX of FIGURE 6;

FIGURE 10 is a front elevational view of the knotter mechanism in position after a tie wire has been passed once therethrough;

FIGURE 10a is a partial view of FIGURE 10 showing the positions of the gripper elements of the knotter mechanism after the tie wire has passed therethrough a second time;

FIGURE 11 is a view similar to FIGURE 3 but with the near side plate and cutter element removed for clarity;

FIGURE 11a is a partial elevational view showing the normal position of the cutter element of the knotter mechanism;

FIGURE 12 is a view similar to FIGURE 11 but showing the elements of the knotter mechanism in position during the first camming action;

FIGURE 13 is a view similar to FIGURE 12 but showing the elements of the knotter mechanism in position during the second camming action;

FIGURE 13a is a view similar to FIGURE 11a but showing the position of the cutter element during the second camming action;

FIGURE 14 is a view similar to FIGURE 13 but showing the elements of the knotter mechanism in position after ejection of the completed knot has taken place; and FIGURE 14a is a view similar to FIGURE 13a but showing the position of the cutter element after ejection of the completed knot has taken place.

Referring more particularly to the drawings, the knotter mechanism of the invention, for purposes of illustration, is shown generally at 3 incorporated in an automatic wire-tying machine 5. As shown in FIGURES 1 and 2, the wire-tying machine 5 includes a conveyor table 7 having a guide track 9 upstanding thereon. The guide track 9 is in the form of a continuous loop and includes a bottom portion below and parallel with the table 7. The bottom portion of the guide track includes a left-hand entry guide portion 13 and a right-hand exit guide portion 15 disposed, respectively, adjacent the right and left ends of the knotter mechanism 3. Knotter mechanism 3, guides 13 and 15 and other elements of the tying machine are mounted on a vertically disposed plate 17, which is secured to the main frame of the machine normal to and below the table 7 (FIGURES 1 and 2). Other elements of the machine include feed-and-tension pinch rolls 19 operated by a reversible hydraulic motor 21 and an escapement or receptacle (not shown) for receiving the excess wire when it is retracted from the machine to strip it out of the track and tension it around a package or bundle.

The general operation of the wire-tying machine 5 will now be briefly described so as to facilitate understanding of the detailed description of the knotter mechanism which follows.

Prior to the initiation of a tying cycle, the leading end of a tie wire W (FIGURE 2) is fed into the machine by the feed-and-tension mechanism 19 from a supply coil (not shown). As the wire is fed in, the leading end thereof is pushed from left to right, as viewed in FIGURE 1, through the guide block 13, knotter 3, guide block 15, around the upper portion of the guide track 9 and then through the guide block 13 and the knotter a second time. For purposes of clarity, the portion of the tie wire W which passes through the guide block 13 and the knotter 3 a second time will be designated W'.

The overlapping portions W and W' of the wire are in contiguous position in the slot 22 of the twister pinion 18 of the knotter mechanism after feeding. After the supply of tie wire has been thus fed into the tying machine is ready to be operated to apply ties around packages P.

Packages P are moved sequentially under the arch of the guide track 9 by means of roller conveyors and are stopped one or more times under the arch for the application of one or more ties therearound. As each package moves into tying position, the wire end W' is held by the gripper jaw 96 of the knotter mechanism and the feed-and-tension mechanism is reversed to pull the wire W from right to left, as viewed in FIGURE 1, to retract it. As the wire is retracted, the loop thereof initially stored in the upper portion of the guide track is pulled out of the track and drawn around the package. After the loop of wire has been drawn around the package, retraction thereof continues until a predetermined tension is imparted to the wire around the package. When the predetermined tension has been achieved, the knotter twister pinion 18 is actuated to twist the overlapping portions of the tie wire together and form a knot adjacent the bottom side of the package. After this has been done, the portion W of the wire is cut adjacent the entry end of the twister pinion and the complete knot is ejected from the knotter mechanism. Wire for the next tie is then fed into the machine so that the tying cycle can be repeated.

The details of the knotter mechanism of the invention will now be described.

The knotter mechanism 3 of the invention comprises a pair of substantially rectangular, spaced side plates 2 and 4 having a cast spacer body 6, forming a deck, extending between the upper portions thereof. The side plates are secured to the spacer body 6 by two transversely extending bolts 8 secured at each end by nuts 8'. The side plates are also secured together by bolts 10 and 12, which extend transversely through two diametrically opposite corners, respectively, of the side plates, as best shown in FIGURES 3, 4 and 5. The bolts 10 and 12 are secured at their ends by suitable nuts abutting the outer surfaces of the side plates. A plurality of spaced sleeves 14 and 16 are fitted on the bolts 10 and 12, respectively, intermediate the ends thereof, as best shown in FIGURES 3, 5 and 10. The bolts 10 and 12 also function as pivot shafts, as will be more fully described hereinafter.

The knotter mechanism 3 is mounted on a rib 23 formed on the vertically disposed plate 17 by means of screws 25, which pass through suitable openings in the rib 23 and are threaded into tapped holes in the side plate 2 (FIGURES 1, 2 and 3).

A twister pinion 18 is rotatably mounted at its ends by sleeve bearings 20 in a cut-out, bifurcated flange integral with and projecting from one end of the casting 6 between the plates 2 and 4. An open-side, wire-receiving slot 22 extends the full length of the twister pinion (FIGURE 6).

A sector gear 24 having an arc edge 28 is mounted for pivotal movement around the shaft of bolt 10 at approximately the center thereof, as best shown in FIGURE 10. A spacer 14 is disposed adjacent each side of the gear 24. An open-end radial slot 26 extends inwardly from the arc edge 28 of the sector gear 24 normal to the shaft of the bolt 10. The major portion of the arc edge 28 is formed with gear teeth and is in mesh with the twister pinion 18 whereby pivotal movement of the gear about the shaft 10 will cause the twister pinion to rotate, as will become apparent.

Two sector plates 52 and 54 are pivotally mounted at their apical ends on the shaft 10 between the side plates 2 and 4, spaced from the sector gear 24, one on each side thereof. A pin 56 extends transversely between and projects through the side plates 2 and 4 and the plates 52 and 54 above the arc edge 28 of the sector gear 24 and has three cam followers 57, 58 and 60 rotatably mounted thereon. As best shown in FIGURE 5, cam followers 57 and 58 are disposed adjacent opposite sides of the sector gear 24, while cam follower 60 is disposed on the projecting end of pin 56 outside of the side plate 2 (FIGURE 7).

Two helical extension springs 62 are attached by one end to the ends of pin 56, projecting outwardly of the side plates 2 and 4. The other ends of the two helical springs 62 are connected to stub shafts 64, which project outwardly from the side plates 2 and 4, as best shown in FIGURE 5. Springs 62 bias the pin 56 and, consequently, plates 52 and 54 in counterclockwise direction, as viewed in FIGURE 3. An opening 65 is provided in each side plate 2 and 4, which permits movement of pin 56.

Two similar cam plates 30 and 32, each having a cam face or edge 70, are pivotally mounted in spaced relation on the shaft of the bolt 12 between the plates 2 and 4 (FIGURES 3 and 10). A cam roller 34 is rotatably mounted between the cam plates 30 and 32 adjacent the lower ends thereof on a pin 36, which is attached to and extends transversely between the cam plates. The cam roller 34 is rotatably fitted in the slot 26 of the sector gear 24 for inward and outward movement therealong.

A fluid pressure cylinder 38, having a piston rod 40 projecting therefrom, is pivotally mounted by means of trunnions 42 between the lower portions of the side plates 2 and 4 adjacent the edges thereof opposite from the bolt 10. The trunnions 42 project from opposite sides of the cylinder 38 and are fitted into suitable openings in the side plates 2 and 4, as best shown in FIGURES 3, 4 and 5.

As best shown in FIGURES 3, 4 and 11, a clevis 44 is pivotally mounted on a pin 46, which is attached to and extends transversely between the ends of the cam plates 30 and 32, remote from the pin 36 on which cam roller 34 is mounted. The projecting end of the piston rod 40 is threaded into the clevis 44.

As seen best in FIGURES 3 and 4, the ends of the cam plates 30 and 32 adjacent the pin 36 are substantially L-shape in conformation and form ejectors 48 and 50, respectively, which function to remove the knot of the tie from the twister pinion after the knot has been formed, as will be more fully described hereinafter.

Each of the cam plates 30 and 32 is formed with spaced rises 66 and 68 in its cam face 70, which are adapted to be engaged by cam followers 57 and 58. The springs 62 constantly urge plates 52 and 54 pivotally about the shaft of bolt 10 in the direction toward the cam plates 30 and 32 so that the cam followers 57 and 58 are in constant engagement with the cam faces 70 of the cam plates 30 and 32, respectively.

Wire guide blocks 72 and 74, having wire grooves 73 and 75, respectively, therethrough, are rigidly mounted on the top edges of the plates 52 and 54, respectively, under a common cover plate 76 (FIGURES 5, 6, 7 and 9). The cover plate 76 and blocks 72 and 74 are affixed to the plates 52 and 54 by screws 78. At one side, cover plate 76 is formed with a jaw extension 77, which overhangs side plate 2 (FIGURE 10). A similar jaw extension 79 is formed on the opposite side of the plate 76, which overhangs side plate 4 (FIGURES 9, 10 and 10a).

A guide finger 80, which is adapted to fit retractably in the open side of slot 22 of the twister pinion 18 to confine wires therein, is fixedly mounted on the underside of the cover plate 76 between the wire guide blocks 72 and 74 (FIGURES 5 and 6).

As best shown in FIGURES 9, 10 and 10a, a substantially rectangularly shaped wire-gripper plate 82 is bolted on the outer surface of the side plate 4 under the overhanging jaw portion 79 of the cover plate 76. The upper edge of the wire-gripper plate is formed with a groove 84 aligned with the slot 22 of the twister pinion 18 (FIGURE 6), which functions to guide wire emerging from the twister pinion and guide 74. The face of the gripper plate 82 remote from the side plate 4 is cut out to form a recess 86 for accommodating the gripper elements of the knotter mechanism of the invention (FIGURES 10 and 10a).

The gripper elements of the knotter assembly include a block 88, which is rigidly mounted on the projecting end of a pin 92 adjacent the outer side of the side plate 4 (FIGURES 9, 10 and 10a). The pin 92 extends transversely through the side plates 2 and 4 and the deck 6. A portion 120 of the pin 92 projects outwardly beyond the plate 2 for a purpose which will become apparent. An elongated holder element 94, rigidly carrying in one end a gripper jaw insert 96 with a projecting, serrated portion 98 thereon, is pivotally mounted intermediate its ends, as at 99, on the block 88. The holder element 94 is so mounted that the gripper jaw 96 moves in an arc within the recess 86 of plate 82 toward and away from the jaw portion 79 of the cover plate 76 when the holder element 94 is pivoted about its pivot point 99 (FIGURES 6, 10 and 10a). If desired, the gripper jaw may be made in T-shape form (not shown) with two oppositely extending serrated heads so that the gripper jaw can be reversed in the holder element after one head becomes worn.

The end of the holder element 94 remote from the gripper jaw 96 is pivotally connected with the piston rod 100 of a fluid pressure cylinder 102. The cylinder 102 is trunnion-mounted between two plates 104, which in turn are bolted to and project from the side plate 4 normal thereto (FIGURES 4, 10 and 10a).

When the knotter assembly of the invention is used in conjunction with a power-driven wire feeding-and-tensioning mechanism, such as mechanism 19, if desired, switch means actuatable by the leading end of the advancing wire may be provided for stopping feeding of the wire strapping after it has been looped around the package to be tied and overlapped in the knotter twister pinion prior to twisting. One form of such switch means is shown in FIGURES 10 and 10a and includes a spring-loaded lever 106 pivotally mounted intermediate its end on a depending projection of the gripper block 88. The upper end 108 of the lever 106 is normally disposed across the end of the groove 84 formed in the gripper plate 82. In this arrangement, the lever 106 is pivoted by the wire emerging from the groove 84 of the gripper plate 82 after the wire has encircled the package. When the lever is thus pivoted, its opposite end 110 opens a switch 112 to stop the feed-and-tension mechanism 19 and halt further movement of the wire.

A cutter plate 114, having a groove 116 in its upper edge for guiding the wire portions W and W', is bolted to the outer surface of the side plate 2 under the overhanging jaw portion 77 of the cover plate 76 (FIGURES 3 and 7). The grooved upper portion of the cutter plate 114 may be in the form of an insert preferably made of tungsten carbide or other suitable hard metal. The groove 116 cooperates with the cover plate 76 to confine the overlapped wire being twisted by the twister pinion 18. The outer, bottom edge of the groove 116 also serves as the fixed cutting edge of the cutter element of the knotter mechanism of the invention in a manner which will become apparent. An elongated block or lever 118, having a cam surface 124 on its underside, is pivotally mounted intermediate its ends on the projecting end 120 of the pin 92 above the cutter plate 114 with one end 123 thereof normally disposed above the groove 116. A cutter blade 122 is carried by the end 123 of the lever 118 for cooperating with the plate 114 at the outer, bottom edge of the groove 116 to cut the wire W from its supply source after the knot has been formed, as will be more fully described.

A groove 126 is formed in the end 123 of the lever 118 below the blade 122, as best shown in FIGURES 3 and 7. When the lever 118 is in horizontal position, groove 126 cooperates with grove 116 to guide the wire during the feeding thereof into the mechanism. A helical compression spring 128 is mounted in a boss affixed to plate 2 below the end 123 of the cutter lever 118 and bears against the underside of the lever end 123 to constantly urge the lever in counterclockwise direction, as viewed in FIGURE 3, to maintain alignment of the groove 126 with the grove 116. Pivotal movement of the lever 118 in counterclockwise direction is limited by a stop plate 130 mounted on the side plate 2.

A guide block 132 is affixed by a cap screw 134 to the end of the spacer body 6 on each side of the bifurcated flange projection thereof adjacent each of the sleeve bearings 20 (FIGURES 5, 6, 10 and 10a). The blocks 132 cooperate with the wire grooves 73 and 75 in the wire guide blocks 72 and 74, respectively, to confine the overlapped wires W and W' in the slot 22 of the twister pinion 18 at the ends of the pinion.

Sleeve bearings 20 are substantially C-shape in form and are normally positioned with their open sides directed upwardly in the knot-ejection direction, as best shown in FIGURE 8, so as to permit unhindered ejection of the knot from the twister pinion after the knotting operation has been completed and the slot of the twister pinion is directed upwardly. A locking pin 136 is removably inserted in suitable matching openings in each block 132 and the adjacent portion of the spacer body 6 to lock the sleeve bearings 20 in upright position with their open sides directed upwardly and to retain the sleeve bearings attached to the spacer body 6 (FIGURE 6).

A switch 138 is mounted on the outer surface of side plate 4 intermediate the shafts 10 and 12 and is adapted to be actuated by a pin 140, which projects from the cam plate 32, as shown in FIGURES 3 and 5, after the knot has been formed and ejected. Actuation of switch 138 causes cylinder 38 to be energized to project piston rod 40 and return sector gear 24 to its initial position. In returning to initial position, gear 24, which is in mesh with twister pinion 18, rotates the pinion so that the open side of the pinion slot 22 is in position for receiving finger 80.

In operation, wire strapping W is fed, by the pinch rolls 19, progressively through the guide block 13, cutter plate groove 116, groove 73 of guide block 72, slot 22 of twister pinion 18, groove 75 of guide block 74, gripper plate groove 84, past the end 108 of lever 106, through the guide block 15, around the guide track 9 to form a loop around the package P to be tied, and then through the same elements again until the leading end of the wire strikes and pivots the lever 106 to thereby actuate switch 112 to stop feeding of the wire.

After the wire has been thus fed into the machine, the knotting sequence is initiated by energizing cylinder 102 to retract its piston rod 100 to pivot gripper holder block 94 so that the leading end of the wire W' is gripped between the serrated gripper jaw 98 and the jaw portion 79 of the cover plate 76. After the end of the wire has thus been gripped, the wire is retracted by the pinch rolls 19 to strip it out of the guide track and tension the loop around the package.

Cylinder 38 is then actuated to retract piston rod 40 and cause cam plates 30 and 32 to pivot about shaft 12 in counterclockwise direction, as viewed in FIGURE 3. During the initial counterclockwise movement of the cam plates 30 and 32, cam rollers 57 and 58 engage the cam rises 66 to pivot sector plates 52 and 54 in clockwise direction about the shaft 10, as viewed in FIGURE 3. This causes wire guide blocks 72 and 74, together with cover plate 76 and finger 80, to move a slight distance away from the twister pinion 18 (FIGURE 13). It will be noted that during movement of the cover plate 76 away from the twister pinion, the leading end of the wire W' continues to be gripped between the gripper jaw 98 and the cover plate as the cover plate slides long the wire. As the cam plates 30 and 32 continue to pivot in counterclockwise direction, cam roller 34 advances inwardly of the slot 26 in the sector gear 24. Initial movement of the cam roller 34 inwardly of the slot 26 has no effect upon the sector gear; however, after the cam followers 57 and 58 pass beyond the rises 66, cam roller 34 continues to advance inwardly of the slot 26 to cause pivoting of the sector gear 24 in clockwise direction about the shaft 10, as viewed in FIGURE 3, to rotate the twister pinion 18 to twist the overlapped portions of the wires W and W' in the slot 22 between the plates 114 and 82 and form a knot.

The ratio of the length of the arc edge 28 of the sector gear 24 to the diameter of the toothed portion of the twister pinion 18 is such that the pinion is rotated three and one-quarter revolutions in the interval from the start to the finish of complete pivotal movement of the sector gear 24, brought about by pivotal movement of cam plates 30 and 32 and movement of cam roller 34 in the slot 26, as described above. Thus, after the twisting operation, the open side of the slot 22, which was directed horizontally before the twisting operation, is directed upwardly so that the completed knot can be ejected from the pinion in the direction toward the package around which the tie is being applied.

After the knot has been formed, piston rod 40 continues to be retracted and pivoting of cam plates 30 and 32 in counterclockwise direction continues. However, due to the relative positions of the slot 26 and cam roller 34 after the knot has been formed, sector gear 24 ceases to pivot. Continued pivoting of cam plates 30 and 32 causes the cam follower 60 to engage the cam surface 124 of the cutter block 118 to pivot the cutter block and cut the knot free from the wire W supply source. Engagement of the cam followers 57 and 58 with the rises 68 causes the guide blocks 72 and 74, together with cover plate 76 and finger 80 to move further away from the twister pinion so that the completed knot can be ejected after it is cut from the tie wire supply source (FIGURE 14). As retraction of piston rod 40 continues, cam plates 30 and 32 continue to pivot in counterclockwise direction until the ejectors 48 and 50 engage the wires W and W' adjacent the ends of the twister pinion and positively eject the completed knot from the twister pinion. At this time, the switch 138 is actuated, by pin 140 coming into engagement with a trigger 139 pivotally mounted on the switch, to energize cylinder 38 in the opposite direction and cause projection of piston rod 40 to pivot cam plates 30 and 32 in clockwise direction. This clockwise movement of the cam plates 30 and 32 causes counterclockwise movement of the sector gear 24 to its initial position, as shown in FIGURES 3 and 11. At the same time, the cam followers 57 and 58 move upwardly along the cam faces of the cam plates 30 and 32 and cause counterclockwise pivotal movement of the sector plates 52 and 54 back to original position. As the cam plates 30 and 32 move in clockwise direction, the cam follower 60 moves away from engagement with the cam surface 124 of the cutter block 118 and the cutter block is restored to initial horizontal position by spring 128.

As the sector plates 52 and 54 move in counterclockwise direction, they move the cover plate 76 back toward the twister pinion and the guide blocks 72 and 74 into engagement with the guide blocks 132. The movement of cover plate 76 back toward the twister pinion also causes the guide finger 80 to substantially close the open side of the slot 22 of the twister pinion, which was rotated back to original position, as shown in FIGURES 3 and 11, by the sector gear 24 as the latter pivoted back to original position after the knot was ejected.

The knotter mechanism of the invention is now in position to receive wire for the next knotting operation.

It will be noted that the cylinders 38 and 102 may be operated with any suitable pressure fluid as desired. The cylinders may be individually operated or arranged in an electro-hydraulic or electro-pneumatic system for automatic operation of the knotter mechanism of the invention. A control system especially suitable for automatically operating the knotter mechanism of the invention is disclosed in co-pending application Serial No. 431,647, filed February 10, 1965.

While one embodiment of our invention has been shown and described, it will be apparent that other adaptations and modifications may be made without departing from the scope of the following claims.

We claim:
1. Knotter mechanism for a wire-tying machine including an article-supporting table, a spacer plate disposed below and substantially parallel with said table, a slotted twister pinion journaled below the surface of said plate, a wire-end gripper adjacent one end of said pinion and a cutter lever adjacent the other end, said mechanism comprising a pair of spaced side plates depending from said spacer plate, one adjacent each end of said pinion, a pair of spaced sector plates journaled between said side plates on a shaft extending through the latter, a pair of spaced cam plates journaled between said side plates on a shaft offset laterally from said first-mentioned shaft and extending through said side plates, a sector gear journaled on said first-mentioned shaft intermediate said sector plates, said gear extending between said cam plates and meshing with said twister pinion, cam followers carried by said sector plates, means urging said sector plates in a direction to effect engagement of said followers with said cam plates, said gear having a radial slot therein and a roller carried by said cam plates fitting in said slot to effect angular movement of said gear on angular movement of said cam plates, and means for exerting torque on said cam plates tending to cause angular movement thereof.

2. Knotter mechanism for a wire-tying machine as defined by claim 1 in which said wire-end gripper is pivotally mounted on one of said side plates and a jaw is mounted on the adjacent sector plate, with which said wire-end gripper cooperates.

3. Knotter mechanism for a wire-tying machine as defined by claim 1 including an additional cam follower carried by said sector plates adapted to engage said cutter lever.

4. A knotter mechanism for a wire-tying machine as defined by claim 1 in which said cam plates have terminal ejector portions adapted to engage portions of a wire tie extending from the ends of the pinion and push the wire tie out of the slot of the pinion.

5. Knotter mechanism for a wire-tying machine as defined by claim 1 in which each sector plate has a wire-guide block mounted thereon adapted to align with the twister pinion when the sector plates are in normanl position.

6. Knotter mechanism for a wire-tying machine including an article-supporting table, a spacer plate disposed below and substantially parallel with said table, a slotter twister pinion journaled below the surface of said plate, a wire-end gripper adjacent one end of said pinion, and a cutter lever adjacent the other end, said mechanism comprising a pair of spaced side plates depending from said spacer plate, one adjacent each end of said pinion, a sector plate journaled between said side plates on a shaft extending through the latter, a cam plate journaled between said side plates on a shaft offset laterally from said first-mentioned shaft and extending through both of said side plates, a sector gear journaled on said first-mentioned shaft adjacent said sector plate, said gear extending adjacent said cam plate and meshing directly with said twister pinion, a cam follower carried by said sector plate, means urging said sector plate in a direction to effect engagement of said follower with said cam plate, said gear having a radial slot therein, a roller carried by said cam plate fitting in said slot to effect angular movement of said gear on angular movement of said cam plate, and power means effecting angular movement of said cam plate less than 180 degrees first in one direction and then the other whereby said sector gear is turned by said roller to effect knot-forming rotation of said pinion and then return to starting position.

References Cited by the Examiner

UNITED STATES PATENTS

| | | | |
|---|---|---|---|
| 2,288,088 | 6/1942 | Harvey | 100—31 |
| 2,655,097 | 10/1953 | Fons et al. | 100—27 X |
| 2,912,099 | 11/1959 | Brouse et al. | 100—26 X |
| 3,099,204 | 7/1963 | Stromberg | 100—31 X |
| 3,207,060 | 9/1965 | Smith | 100—31 X |
| 3,232,216 | 2/1966 | Cranston | 100—31 X |

LOUIS O. MAASSEL, *Primary Examiner.*